(12) United States Patent
Milici

(10) Patent No.: US 10,909,714 B2
(45) Date of Patent: Feb. 2, 2021

(54) METHOD, APPARATUS, AND SYSTEM FOR PROVIDING A DISTANCE MARKER IN AN IMAGE

(71) Applicant: HERE GLOBAL B.V., Eindhoven (NL)

(72) Inventor: Mike Milici, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 120 days.

(21) Appl. No.: 16/175,368

(22) Filed: Oct. 30, 2018

(65) Prior Publication Data

US 2020/0134853 A1    Apr. 30, 2020

(51) Int. Cl.
*G06T 7/70* (2017.01)
*G06K 9/00* (2006.01)
*G01C 21/32* (2006.01)
*B60R 11/04* (2006.01)

(52) U.S. Cl.
CPC ............ *G06T 7/70* (2017.01); *B60R 11/04* (2013.01); *G01C 21/32* (2013.01); *G06K 9/00791* (2013.01); *G06T 2207/30252* (2013.01)

(58) Field of Classification Search
None
See application file for complete search history.

(56) References Cited

U.S. PATENT DOCUMENTS

| 8,896,686 | B2 | 11/2014 | Chen et al. | |
|---|---|---|---|---|
| 9,555,803 | B2* | 1/2017 | Pawlicki | G01S 13/867 |
| 9,643,605 | B2* | 5/2017 | Pawlicki | G08G 1/16 |
| 9,834,216 | B2* | 12/2017 | Pawlicki | B60Q 9/008 |

(Continued)

FOREIGN PATENT DOCUMENTS

JP    2005341081 A    12/2005

OTHER PUBLICATIONS

Seo et al., "Use of a Monocular Camera to Analyze a Ground Vehicle's Lateral Movements for Reliable Autonomous City Driving", Proceedings of IEEE IROS Workshop on Planning, Perception and Navigation for Intelligent Vehicles, Nov. 2013, 7 pages.

(Continued)

*Primary Examiner* — Nancy Bitar
(74) *Attorney, Agent, or Firm* — Ditthavong & Steiner P.C.

(57) ABSTRACT

An approach is provided for rendering a distance marker in an image. The approach, for example, involves determining a plurality of camera characteristics of a camera used to capture the image. The plurality of camera characteristics, for instance, can include a camera field of view, a horizon offset, a camera mounting height, a camera mounting axis, or a combination thereof. The approach also involves determining a ground plane extending to a horizon depicted in the image, a camera position with respect to the ground plane, and an image plane based on the plurality of characteristics, wherein the image plane is orthogonal to the ground plane and intersects the ground plane at a designated distance from the camera position. The approach further involves projecting a ray from the camera position through the distance marker on the ground plane to a marker position on the image plane, and rendering the distance marker in the image based on the marker position on the image plane.

19 Claims, 17 Drawing Sheets

(56) References Cited

U.S. PATENT DOCUMENTS

| | | | | |
|---|---|---|---|---|
| 10,118,618 B2* | 11/2018 | Pawlicki | .................. | G06T 7/60 |
| 10,288,434 B2* | 5/2019 | Dorum | .................. | G01C 21/30 |
| 10,351,135 B2* | 7/2019 | Pawlicki | .................. | G08G 1/16 |
| 10,683,008 B2* | 6/2020 | Pawlicki | .................. | G06T 7/60 |
| 2010/0111370 A1* | 5/2010 | Black | .................. | G06K 9/00369 |
| | | | | 382/111 |
| 2012/0158250 A1* | 6/2012 | Stiegler | .................. | G06T 7/20 |
| | | | | 701/45 |
| 2015/0178573 A1* | 6/2015 | Viswanath | .................. | G06K 9/00791 |
| | | | | 382/103 |
| 2016/0377440 A1* | 12/2016 | Dorum | .................. | G01C 21/30 |
| | | | | 702/150 |
| 2017/0195568 A1* | 7/2017 | Leizerovich, Jr. | ... | H04N 5/2252 |
| 2017/0322035 A1* | 11/2017 | Dorum | .................. | G01C 21/32 |
| 2018/0046867 A1* | 2/2018 | Yang | .................. | G06K 9/6215 |
| 2018/0154830 A1 | 6/2018 | Tsuji | | |
| 2018/0259339 A1* | 9/2018 | Johnson | .................. | G01S 7/24 |
| 2019/0180502 A1* | 6/2019 | Englard | .................. | G01S 17/89 |
| 2019/0251356 A1* | 8/2019 | Rivers | .................. | G06T 3/60 |

OTHER PUBLICATIONS

Joglekar et al., "Depth Estimation Using Monocular Camera", International Journal of Computer Science and Information Technologies, vol. 2 (4), 2011, 1758-1763.

* cited by examiner

METHOD, APPARATUS, AND SYSTEM FOR PROVIDING A DISTANCE MARKER IN AN IMAGE

BACKGROUND

Modern location-based services and applications (e.g., autonomous driving) rely on having accurate and up-to-date digital map data. One approach to maintaining digital map data is to deploy vehicles to capture images/photographs of map features and then use the images to place or map-match the features to the digital map. However, accurate and consistent distance estimation using images or photographs can present significant technical challenges, particularly when a single non-stereoscopic image is taken. As a result, placing map features identified using a single image can lead to subjective or inconsistent distance estimation.

SOME EXAMPLE EMBODIMENTS

Therefore, there is a need for an approach for providing an accurate distance marker in an image, e.g., for distance estimation and/or map feature placement.

According to one embodiment, a method for rendering a distance marker in an image comprises determining a plurality of camera characteristics of a camera used to capture the image. The plurality of camera characteristics includes, for instance, a camera field of view, a horizon offset, a camera mounting height, a camera mounting axis, or a combination thereof. The method also comprises determining a ground plane extending to a horizon depicted in the image, a camera position with respect to the ground plane, and an image plane based on the plurality of characteristics. The image plane is orthogonal to the ground plane and intersects the ground plane at a designated distance from the camera position. The method further comprises projecting a ray from the camera position through the ground plane to the image plane (e.g., by determining a first marker position on the ground plane that corresponds to the distance marker, and then projecting the ray from the camera through the first marker position to a second marker position on the image plane). The method then comprises rendering the distance marker in the image based on the projected ray (e.g., the second marker position) on the image plane.

According to another embodiment, an apparatus for rendering a distance marker in an image comprises at least one processor, and at least one memory including computer program code for one or more computer programs, the at least one memory and the computer program code configured to, with the at least one processor, cause, at least in part, the apparatus to determine a plurality of camera characteristics of a camera used to capture the image. The plurality of camera characteristics includes, for instance, a camera field of view, a horizon offset, a camera mounting height, a camera mounting axis, or a combination thereof. The apparatus is also caused to determine a ground plane extending to a horizon depicted in the image, a camera position with respect to the ground plane, and an image plane based on the plurality of characteristics. The image plane is orthogonal to the ground plane and intersects the ground plane at a designated distance from the camera position. The apparatus is further caused to project a ray from the camera position through the ground plane to the image plane (e.g., by determining a first marker position on the ground plane that corresponds to the distance marker, and then projecting the ray from the camera through the first marker position to a second marker position on the image plane). The apparatus is then caused to render the distance marker in the image based on the projected ray (e.g., the second marker position) on the image plane.

According to another embodiment, a non-transitory computer-readable storage medium for rendering a distance marker in an image way carries one or more sequences of one or more instructions which, when executed by one or more processors, cause, at least in part, an apparatus to determine a plurality of camera characteristics of a camera used to capture the image. The plurality of camera characteristics includes, for instance, a camera field of view, a horizon offset, a camera mounting height, a camera mounting axis, or a combination thereof. The apparatus is also caused to determine a ground plane extending to a horizon depicted in the image, a camera position with respect to the ground plane, and an image plane based on the plurality of characteristics. The image plane is orthogonal to the ground plane and intersects the ground plane at a designated distance from the camera position. The apparatus is further caused to project a ray from the camera position through the ground plane to the image plane (e.g., by determining a first marker position on the ground plane that corresponds to the distance marker, and then projecting the ray from the camera through the first marker position to a second marker position on the image plane). The apparatus is then caused to render the distance marker in the image based on the projected ray (e.g., the second marker position) on the image plane.

According to another embodiment, an apparatus for rendering a distance marker in an image comprises means for determining a plurality of camera characteristics of a camera used to capture the image. The plurality of camera characteristics includes, for instance, a camera field of view, a horizon offset, a camera mounting height, a camera mounting axis, or a combination thereof. The apparatus also comprises means for determining a ground plane extending to a horizon depicted in the image, a camera position with respect to the ground plane, and an image plane based on the plurality of characteristics. The image plane is orthogonal to the ground plane and intersects the ground plane at a designated distance from the camera position. The apparatus further comprises means for projecting a ray from the camera position through the ground plane to the image plane (e.g., by determining a first marker position on the ground plane that corresponds to the distance marker, and then projecting the ray from the camera through the first marker position to a second marker position on the image plane). The apparatus then comprises means for rendering the distance marker in the image based on the projected ray (e.g., the second marker position) on the image plane.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a distance marker in an image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
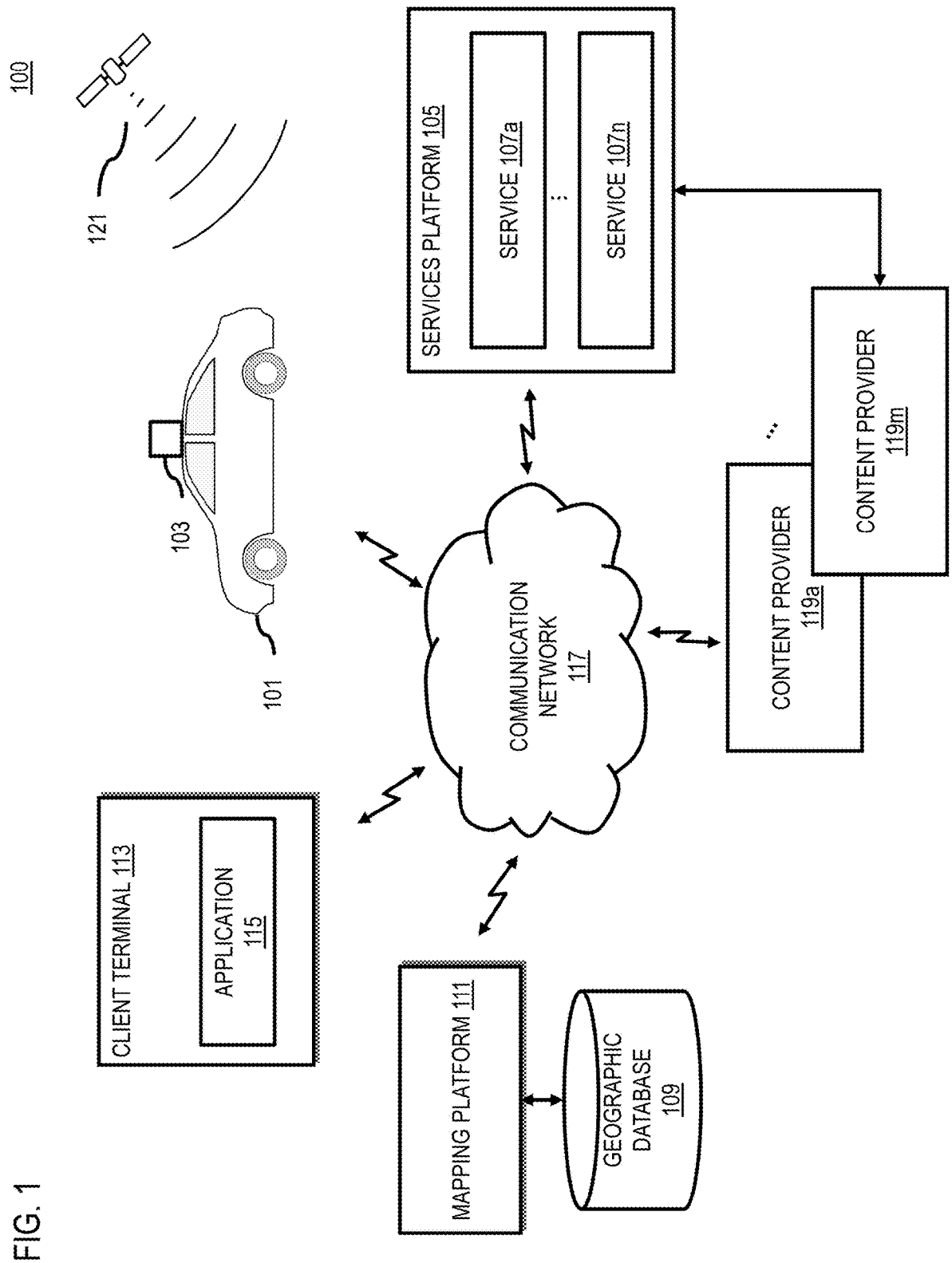
FIG. 1 is a diagram of a system capable of providing a distance marker in an image, according to one embodiment.

FIG. 1 is a diagram of a system capable of providing a distance marker in an image, according to one embodiment. Under conventional approaches, using imagery to determine map attribute/feature placement generally requires use of multiple or stereoscopic images to determine the locations of objects depicted in the imagery with a level of accuracy needed for location-based services (e.g., mapping, navigation, etc.). In other words, determining distances to objects usually requires multiple images of objects taken from slightly different camera positions in order to accurately calculate the relative positions of the objects. When these conventional tools are not used the placement of detected features/attributes/objects from imagery is subjective and imprecise at best. On the other hand, when these conventional tools are used, they require multiple images and take more operator time. As a result, scaling these tools to for large-scale mapping can require significant resources, e.g., in terms of manpower.

Moreover, in many cases for many map service providers (e.g., providers operating a services platform 105 and/or any of the services 107a-107n, also collectively referred to as services 107), map attributes or features may only appear in a single image obtained from specialized mapping vehicles and/or participating crowd-sourced vehicles (e.g., a vehicle 101 on which a camera 103 is mounted to capture imagery of roadway or nearby environment). In this single image case, measurement of attribute/feature placement is highly subjective and dependent on the skill of any number of different individuals manually processing the imagery. As a result, conventional processes for map feature/attribute placement using single images or photographs often suffer from low levels of accuracy and reliability.

Figure 2:
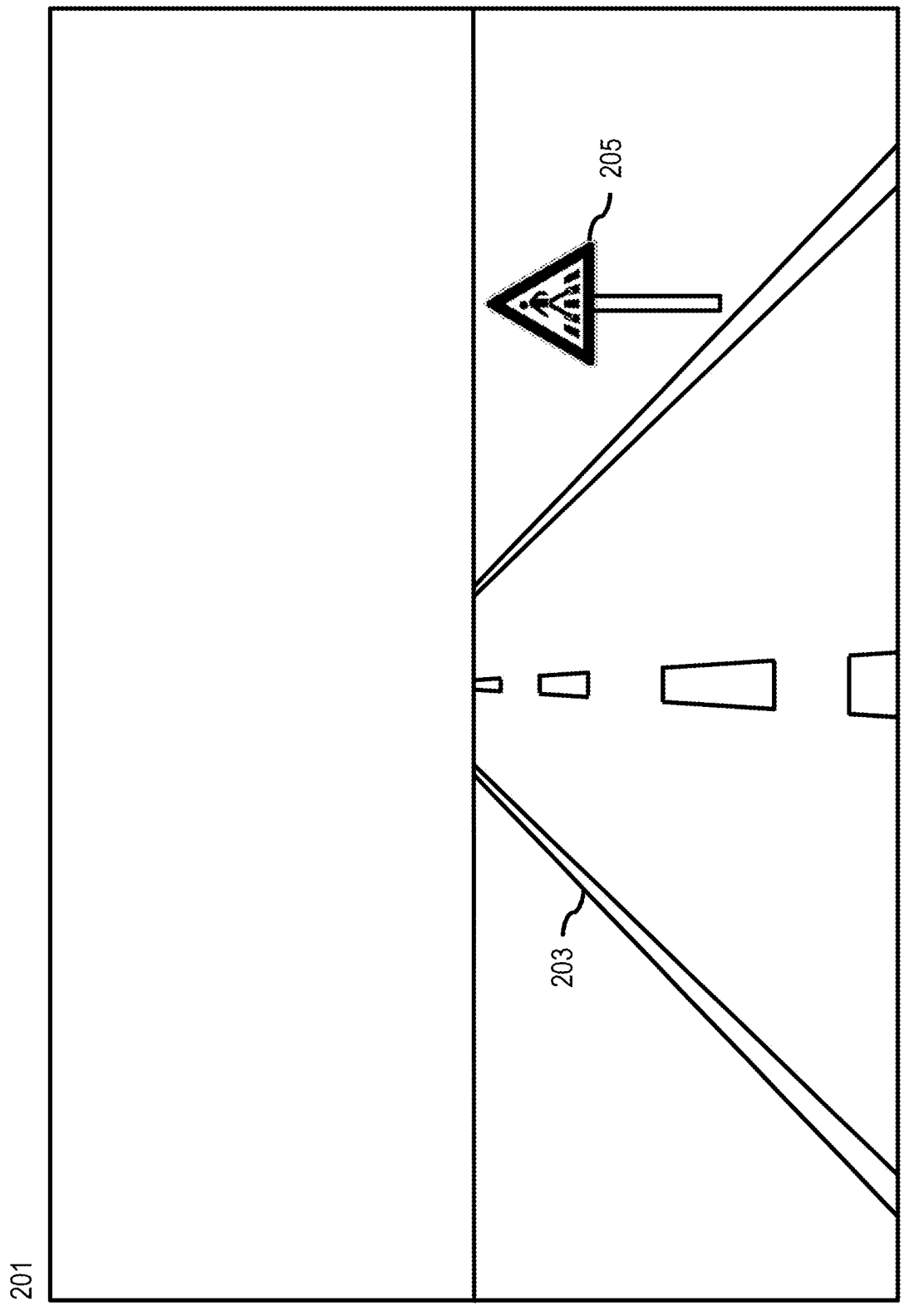
FIG. 2 is an example image captured for placement of map features, according to one embodiment.

FIG. 2 is an example image captured for placement of map features, according to one embodiment. In the example of FIG. 2, a single image 201 has been captured from a camera 103 mounted on a vehicle 101 traveling a roadway 203. As shown, the image 201 depicts the roadway 203 as well as road sign 205 adjacent to the roadway. The road sign is an example of a map feature or attribute that can be placed and mapped into a digital map (e.g., a digital map of a geographic database 109). However, placement of the road sign 205 (i.e., estimating its true geographic coordinates or position related to known coordinates) is a significant technical challenge because there is no reference distances or distance markers in the image 201. As a result, a human operator would have to subjectively estimate the road sign's location (e.g., by looking at it's relatively size to other depicted features such as lane markings). This type of estimation, however, is highly susceptible to error, particularly when different cameras, camera mounting heights, camera mounting axes (e.g., mounting tilts), lens, fields of view, etc. can be used between different images. Therefore, placement of road sign 205 at any particular geocoordinate using conventional approaches would also be high subjective and error-prone.

To address this technical problem, the system 100 of FIG. 1 introduces a capability to use known camera configurations/characteristics of a camera 103 used to capture an image being evaluated to determine an accurate scale for distance markers. These distance markers can be applied to any mounted cameras and provide a quantitative accuracy to map feature/attribute placement. Providing distance markers scaled based on camera characteristics eliminates the need for multiple images and reduces the complexity of the human interaction.

Figure 3:
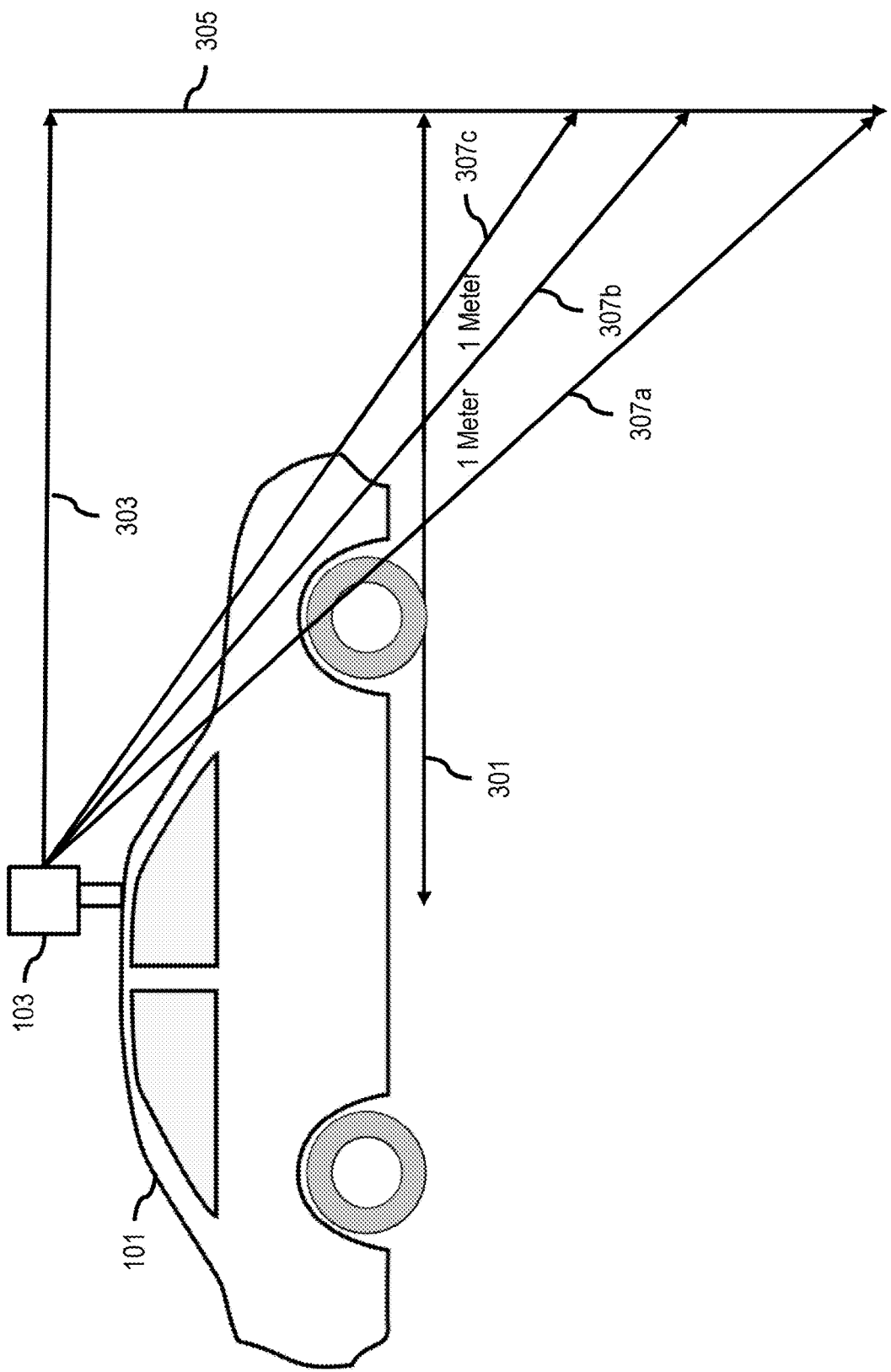
FIG. 3 is a diagram illustrating an example process for rendering distance markers on an image, according to embodiment.

In one embodiment, the system 100 can use camera attributes/configurations such as but not limited to the following:

Camera field of view (FOV);
Height and axis for camera mounting; and
Camera sensor array (e.g., CCD array) centerline (e.g., vertical point at which the horizon appears in the camera sensor);

In one embodiment, the system 100 uses the camera attributes/configurations to determine the spatial arrangement of the camera 103 (e.g., camera position) with respect to two planes: (1) a ground plane, and (2) an image plane. As shown in FIG. 3, the ground plane 301, for instance, represents the surface on which the vehicle 101 is traveling. Generally, the camera 103 is normally mounted perpendicular to the vehicle 101 so that the horizon vector 303 from the camera 103 to the image plane 305 is parallel to the ground plane 301. This is because the image plane 305 is orthogonal to the ground plane 301. The height of the horizon vector 303 above the ground plane 301 corresponds to the height of the camera 103 above the ground. In one embodiment, the image plane 305 represents the two-dimensional projection of the three-dimensional environment that forms the captured image.

It is noted that the various embodiments described herein are generally discussed with respect to providing distance markers for terrestrial vehicles 101 (e.g., cars, trucks, trains, buses, etc.) where the ground plane 301 represents the ground surface on which the vehicle 101 travels. However, it is contemplated that the embodiments described herein are also applicable to vehicles that travel through media other than terrestrial media, such as but not limited to aerial vehicles (e.g., drones, planes, etc.) and marine vehicles (e.g., surface ships, submarines, etc.). In the case of other media, the ground plane can correspond a plane extending in along the direction of travel through a reference point on the vehicle 101 (e.g., a centerline, the bottom most point, top most point, etc.). For example, for an aerial drone traveling, the ground level is can be the centerline of the drone with the camera 103 mounted either above or below the centerline. For a surface ship, the ground plane can be the surface of the water with the camera mounted either above or below the water.

In one embodiment, after determining the camera position, the ground plane 301, and image plane 305, the system 100 can use a ray tracing approach or equivalent to connect two planes. In other words, the image plane 305 can be a wall projected at a distance such as 100 meters or other designated distance, with the ground plane 303 being like glass and the light or rays 307a-307c (also collectively referred to as rays 307) going from the camera 103 through the ground plane 301 to the image plane 305. Conceptually, the image plane 305 corresponds to the camera sensor array (e.g., CCD array) of the camera 103 such that the image plane 305 has the same extent as the image area of the camera sensor array.

In one embodiment, the system 100 can precisely determine or designate the distance of a ray 307 on the ground plane 301, and then project the ray 307 to the image plane 305 to determine where on the camera sensor array the ray 307 corresponding to the known distance marker would fall. By way of example, the system 100 can project a single ray 307 to render a single distance marker at a designated location on the ground plane 301 or multiple rays 307 to render respective multiple distance markers on the image plane 305 (and therefore the image itself). In the example of FIG. 3, the rays 307a-307c are located 1-meter apart on the ground plane 301 and are then projected through to the image plane 305 to provide a foreshortened arrangement of the 1-meter apart rays 307 from the perspective of the camera 103 such that rays 307a and 307b are rendered farther apart on the image plane 305 than the rays 307b and 307c. In other words, the intersection points of the rays 307 with the image plane 305 correspond to the distance markers that are 1-meter apart.

Figure 4:
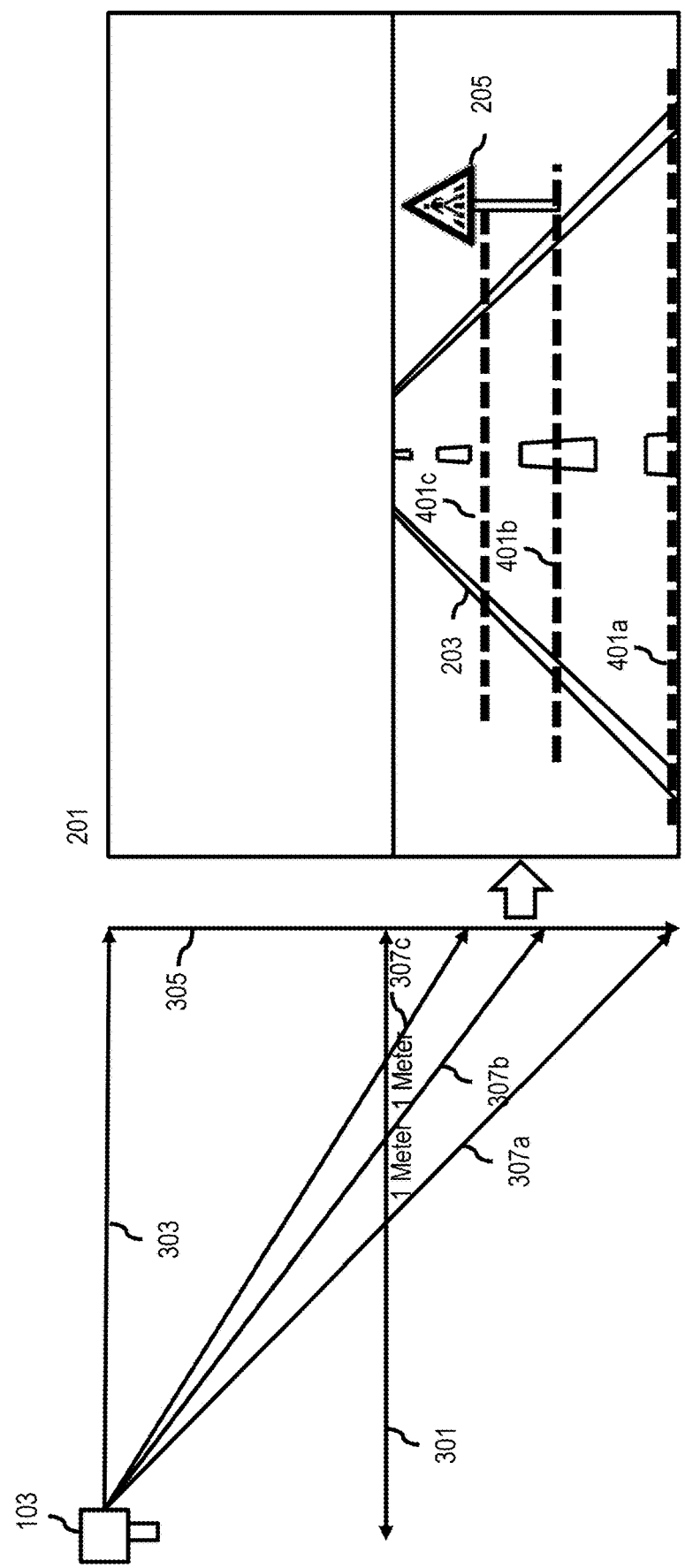
FIG. 4 is an example image on which distance markers have been rendered, according to one embodiment.

In this way, the system 100 can use the rays 307 to create and render one or more distance markers showing lateral or longitudinal distance for a mounted camera 103 using a single image as shown in FIG. 4. The example of FIG. 4 combines the example image 201 of FIG. 2 with the projected rays 307 of FIG. 3 to produce a version of the image 201 in which distance markers 401a-401c (e.g., corresponding respectively to rays 307a-307c) are rendered to indicate accurately scaled markers for estimating distance. In this example, distance marker 401a is located at a base distance from the camera (e.g., determinable from a field of view of the camera 103 as described below), distance marker 401b is located at base distance+1 meter, and distance marker 401c is located at base distance+2 meters per the distances of the markers on the ground plane 303. Accordingly, the location of the road sign 205 depicted at the image 201 is can be determined accurately as base distance+1 meter because the road sign 205 falls on the distance marker 401b. The embodiments for providing distance markers are discussed in more detail below.

Figure 5:
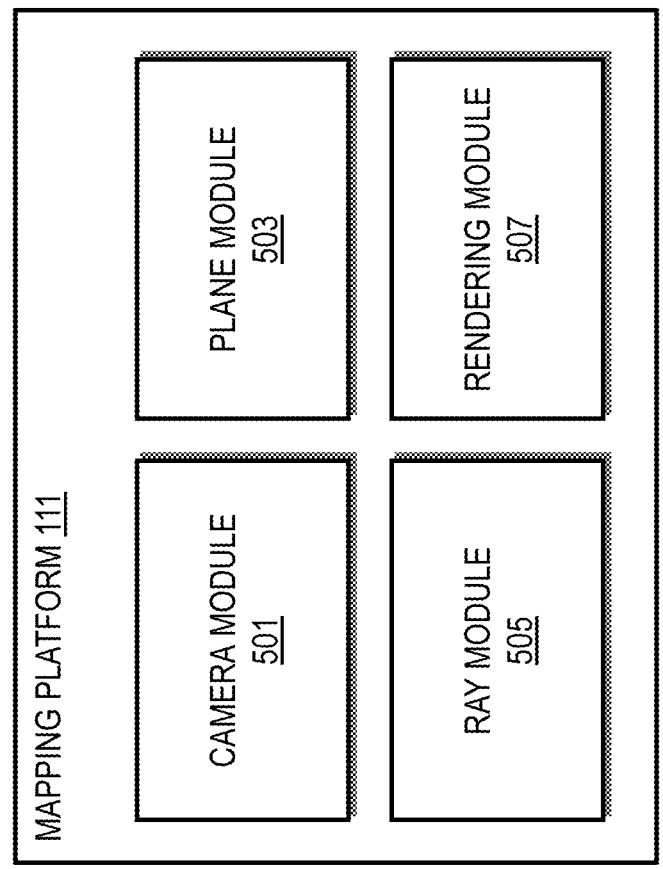
FIG. 5 is a diagram of the components of a mapping platform for providing a distance marker in an image, according to one embodiment.

In one embodiment, the system 100 can include a mapping platform 111 for providing a distance marker in an image according to the embodiments described herein. As shown in FIG. 5, the mapping platform 111 includes one or more components such as a camera module 501, a plane module 503, a ray module 505, and a rendering module 507. The above presented modules and components of the mapping platform 111 can be implemented in hardware, firmware, software, or a combination thereof. It is contemplated that the functions of these components may be combined or performed by other components of equivalent functionality. Though depicted as a separate entity in FIG. 1, it is contemplated the mapping platform 111 may be implemented as a module of any of the components of the system 100. In another embodiment, the mapping platform 111 and/or any of the modules 501-507 may be implemented as a cloud-based service, local service, native application, or combination thereof. The functions of the mapping platform 111 and/or these modules are discussed with respect to FIGS. 6-13 below.

Figure 6:
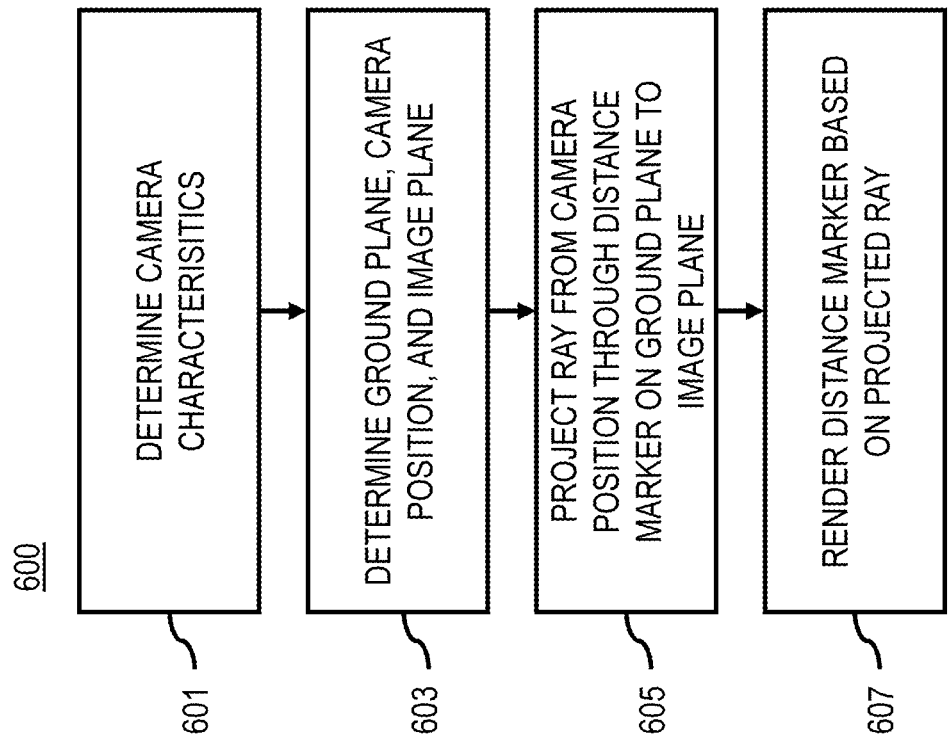
FIG. 6 is a flowchart of a process for providing a distance maker in an image, according to one embodiment.
Figure 16:
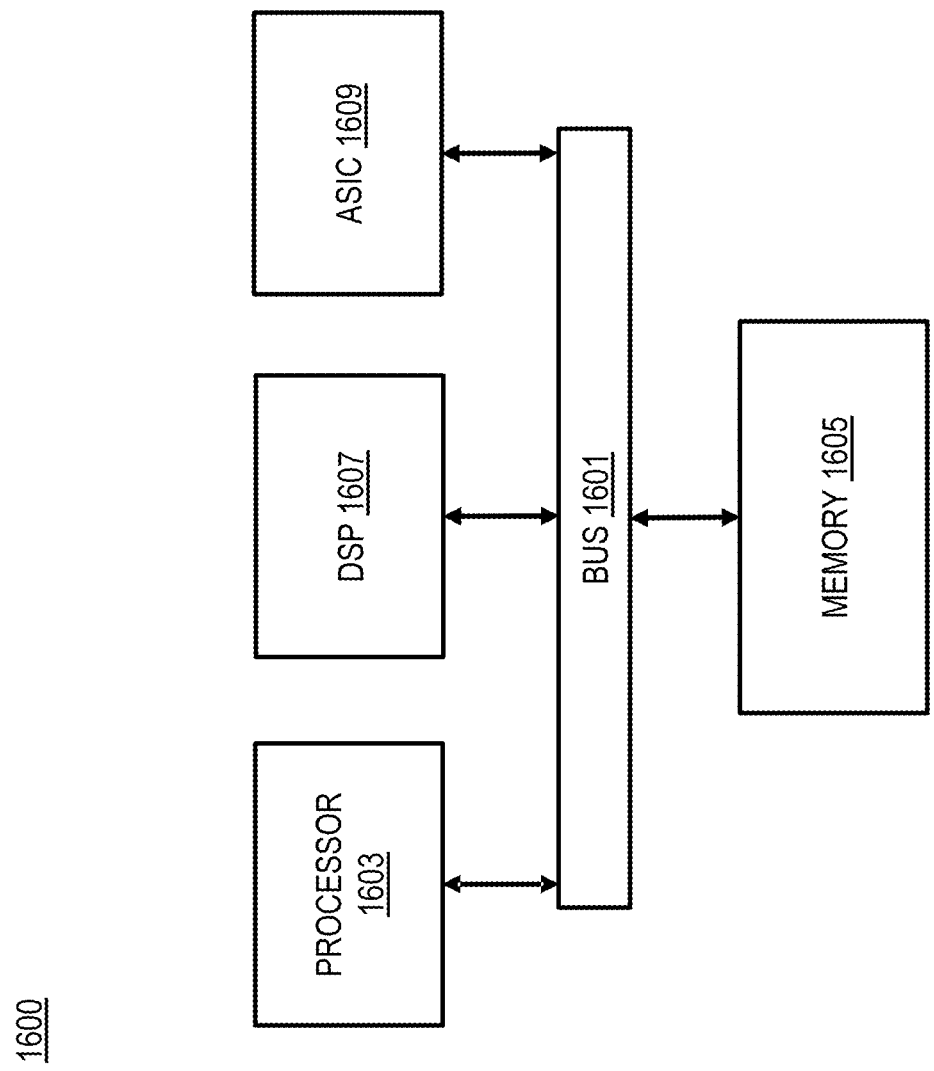
FIG. 16 is a diagram of a chip set that can be used to implement an embodiment.

FIG. 6 is a flowchart of a process for providing a distance maker in an image, according to one embodiment. In various embodiments, the mapping platform 111 and/or any of the modules 501-507 may perform one or more portions of the process 600 and may be implemented in, for instance, a chip set including a processor and a memory as shown in FIG. 16. As such, the mapping platform 111 and/or any of the modules 501-507 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the camera module 501 determines a plurality of camera characteristics of a camera used to capture an image being processed for rendering distance markers. By way of example, the plurality of camera characteristics can include but is not limited to a camera field of view, a horizon offset, a camera mounting height, a camera mounting axis, or a combination thereof. The camera field of view represents the angular extent of the image captured by the camera and can be dependent any a variety of camera characteristics including but not limited to camera lens focal length, size of the camera sensor, etc., and is usually provided as an angular measurement (e.g., 120°). The horizon offset represents an area or start of the areas of a sensor array of the camera that corresponds to an image area that is below the horizon depicted in the image (e.g., represented as the proportion of the vertical distance of the camera sensor array that is below the horizon to the total vertical distance of the camera sensor array, typically at approximately 40% or below). The camera mounting height represents the distance or position that the camera is above or below the ground plane. The camera mounting axis represents the mounting angle of the camera with respect to the ground plane (e.g., typically the mounting axis is perpendicular to the ground plane).

Figure 7:
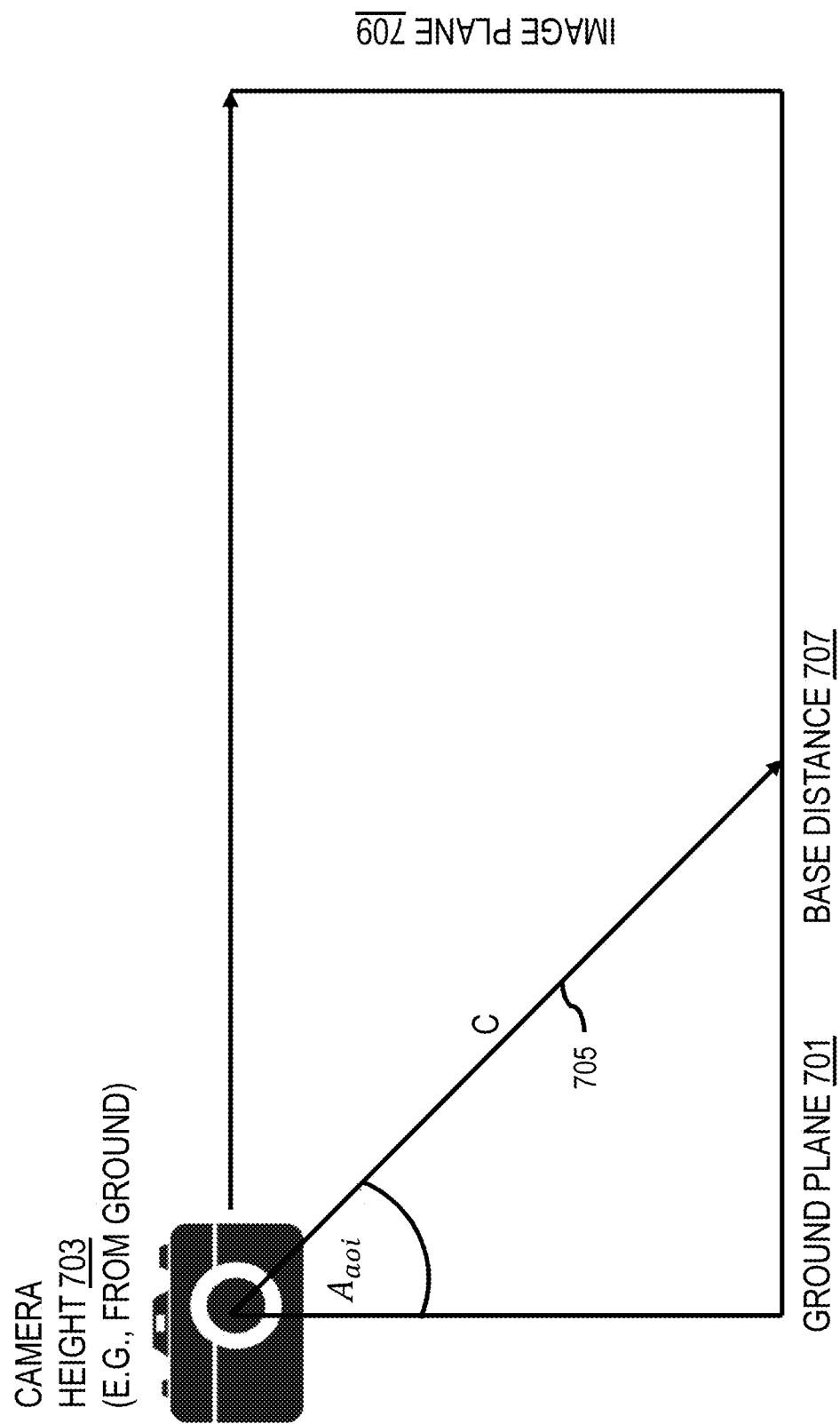
FIG. 7 is diagram of process for calculating a base distance along a ground plane based on a camera field of view and mounting height, according to one embodiment.

In step 603, the plane module 503 determines a ground plane extending to a horizon depicted in the image, a camera position with respect to the ground plane, and an image plane based on the plurality of characteristics. For example, as shown in FIG. 7, the ground plane 701 can be determined from the camera height 703 with the ground plane 701 located at the camera height distance value below the camera position. For example, a typical camera height (h) can be 2.53 m. As another example, the base distance 707 (e.g., distance along the ground plane 701 to the bottom of the image) can be calculated from the camera field of view characteristic. As shown, when the projection angle ($A_{aoi}$) of the ray 705 is set based on the camera field of view for the camera lens, the intercept of the ray 705 (e.g., intercept with length C) with the ground plane 701 corresponds to the base distance (d). The value of the C can be determined based on the h and the $A_{aoi}$, and then from the value of d can be determined from:

$$c = \sqrt{(h^2 + d^2)}$$

In other words, the bottom most location depicted in an image is located at the base distance (d) away from the camera position. In this way, other distance markers in the image can then be referenced with respect to the base distance to obtain a true distance to the camera from any location in the image.

In one embodiment, the image plane 709 is orthogonal to the ground plane 701 and intersects the ground plane 701 at a designated distance from the camera position. As discussed above, the image plane 709, for instance, correlates to the image area of camera sensor array or image. Accordingly, in one embodiment, the image plane corresponds to a two-dimensional projection or wall of an environment depicted in the image.

In step 605, the ray module 505 projects a ray from the camera position through the distance marker on the ground plane to a marker position on the image plane. For example, the ray module 505 determines a first marker position on the ground plane that corresponds to the distance marker. Then, the ray module 505 projects a ray from the camera position through the first marker position on the ground plane to a second marker position on the image plane. In one embodiment, the ray module 505 can project a single marker or a plurality of markers.

Figure 8:
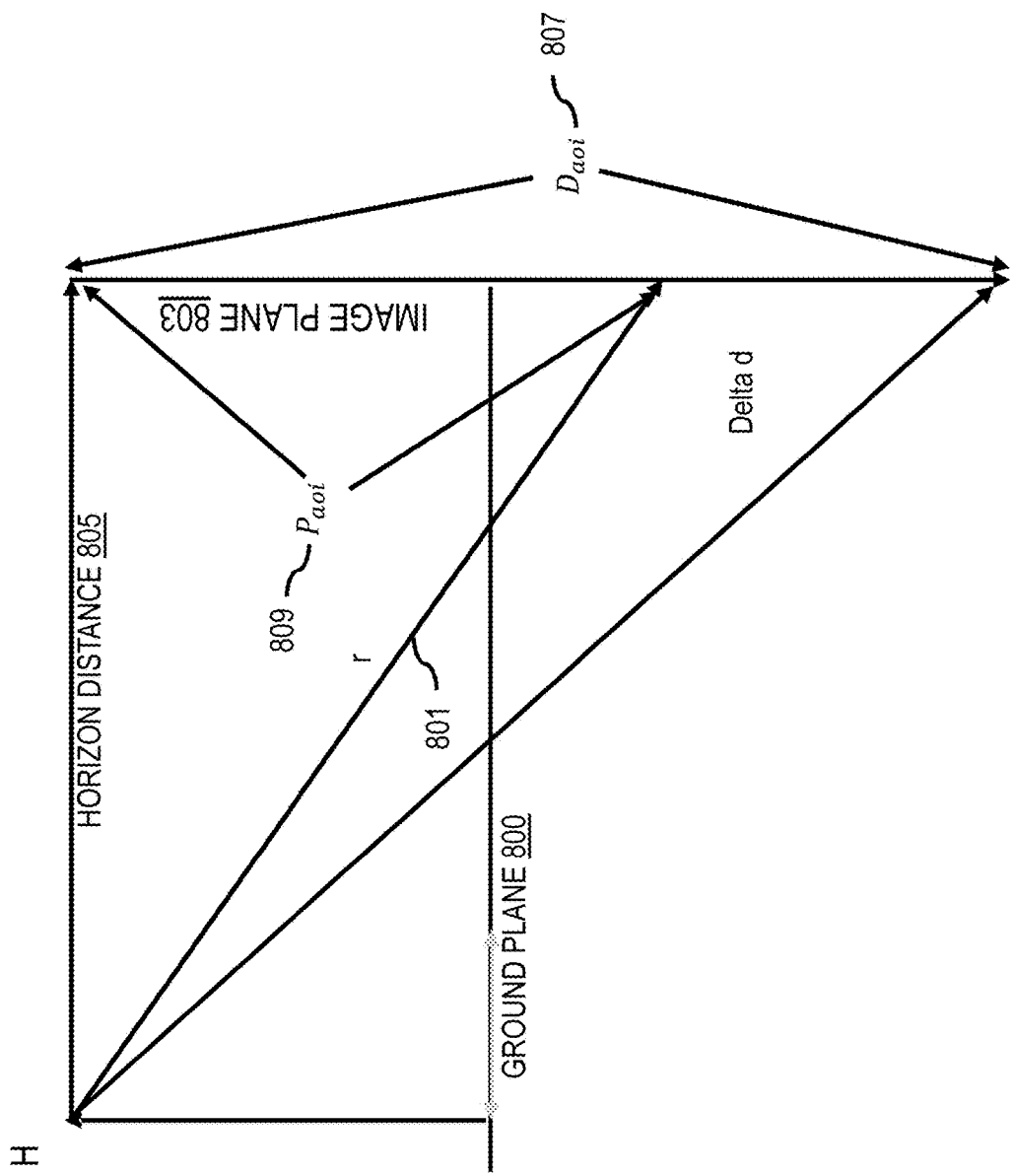
FIG. 8 is a diagram of a process for rendering a single distance marker in an image, according to one embodiment.

FIG. 8 illustrates an example for placing or rendering a single distance marker in an image. In the example of FIG. 8, the camera module 501 can determine various camera characteristics or configurations such as but not limited to:

FOV=Camera Field of View
H=Fixed Image Plane Distance
h=Fixed Height of Camera
$P_{ccd}$=Ratio of image that falls below the horizon (typically 0.4)

Based on the determined camera characteristics or configurations, the ray module 505 can use the any of the following equations to derive the base distance (d) as described above and as summarized below:
d=distance along ground plane that the marker is to be placed at which can be used with the following:

$$c = \sqrt{(h^2 + d^2)} \quad (1)$$

where c is the length of the ray projected from the camera to the intercept on the ground plane 800 corresponding to the base distance (d).

As shown in FIG. 8, the angle of incidence ($A_{aoi}$) that the ray 801 (r) from the camera is projected to the image plane 803 (P) at the horizon distance 805 can be computed as based on the base distance and camera height as follows:

$$A_{aoi} = \arcsin\left(\frac{d}{c}\right) \quad (2)$$

The length of the ray 801 from the camera 103 to the image plane 803 can be computed as follows:

$$r = \frac{H}{\sin(A_{aoi})} \quad (3)$$

The distance (P) of the distance marker location on the image plane 803 for a singly placed marker can be calculated as follows:

$$P = r \times \cos(A_{aoi}) \quad (4)$$

In one embodiment, the ray module 505 can also calculate the angle of ground incidence which gives the full depth of the image plane at the horizon as follows:

Angle of Camera Field of View, $A_{fov}$=FOV/2

In one embodiment, the ray module 505 calculates a proportion of a length swept out for the ray through the first maker position with respect to the designated distance at which the image plane intersects the ground plane. The rendering module 507 then applies the proportion to the horizon offset on the image plane to determine a rendering position of the distance marker at the second marker position of the image plane. This is process is further explained below. As shown in FIG. 8, the deepest P in the image ($D_{aoi}$ 807) can be computed as follows:

$D_{aoi}$=P(using equations 3 and 4 for $r$ and $P$ from above, with $A_{fov}$)

The P for a target angle of incidence of the singly place distance marker ($P_{aoi}$ 809) can then be calculated as follows:

$P_{aoi}$=P(using all four equations 1-4 above)

Given $D_{aoi}$ 807 and $P_{aoi}$ 809, the ray module 505 can then calculate the normalized final placement of the requested single distance marker (FinalPlacement$_d$). In other words, in one embodiment, the ray module 505 can normalize the proportion to 1 before applying the proportion against the horizon offset.

In one embodiment, the final placement is normalized to between 0 to 1 along the centerline of the image, representing the distance marker placement on the image plane 803, and can be calculated as follows:

FinalPlacement$_d$=($D_{aoi}$−$P_{aoi}$)/$D_{aoi}$×$P_{ccd}$

In step 607, the rendering module 507 renders the distance marker in the image based on the calculated final placement of marker position on the image plane. As used herein, rendering the distance marker refers to both of the following embodiments: (1) a first embodiment in which rendering comprises presenting a representation of the distance of marker in the image on a physical display device or a user interface of the device; and (2) a second embodiment in which rendering comprises identifying the distance marker virtually without displaying the distance marker or image on a display device. For example, the first embodiment can be applicable to use cases in which the system 100 is configured to display the distance marker(s) overlaid on the image to end users. The second embodiment can be applicable to use cases such as autonomous driving in which an autonomous vehicle or vehicle control system renders the distance markers virtually to compute distances to nearby objects for navigation or other operational purposes. In this autonomous driving use case, the distance marker information is used by the vehicle without user interaction, therefore the distance marker and/or related need not be displayed on a physical display device.

Figure 9:
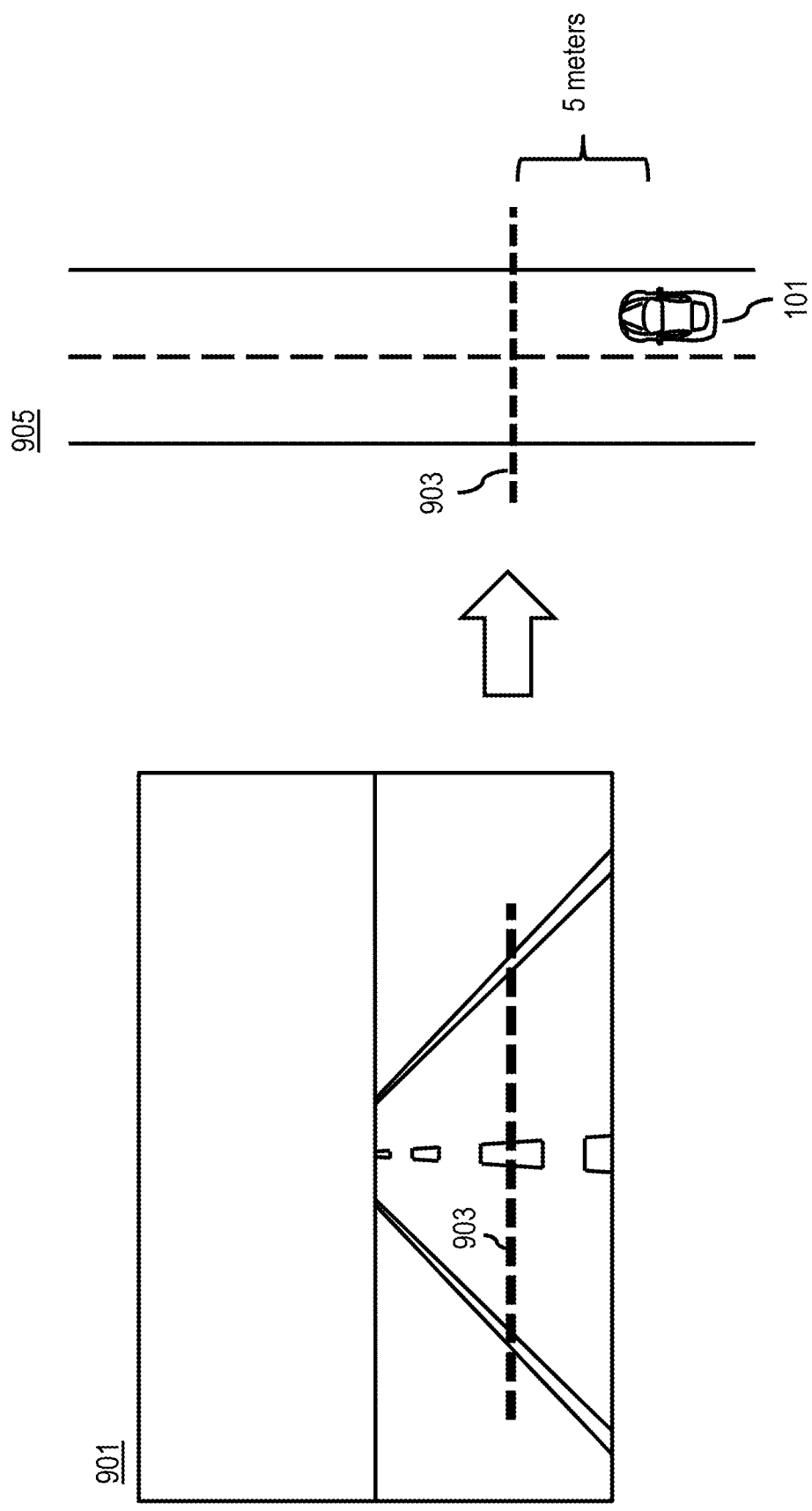
FIG. 9 is an example image in which a single distance marker has been rendered in an image, according to one embodiment.

FIG. 9 is an example image 901 in which a single distance marker 903 has been rendered, according to one embodiment. In this example, a user has configured the mapping platform 111 to place the single distance 903 marker at a distance of 4 meters (e.g., d=5 meters) from the camera mounted at a h=2.53 meters above the ground plane with a FOV of 120° and a $P_{ccd}$=0.4 (e.g., the horizon offset). Using equations 1-4 above, the rendering module 507 calculates the final placement of the distance marker 903 with respect to the image plane corresponding to the camera sensor array as shown in image 901. To compare from an overhead perspective 905 of the vehicle 101 traveling on the roadway, the distance marker is 5 meters from the camera mounting position on the vehicle 101.

Figure 10:
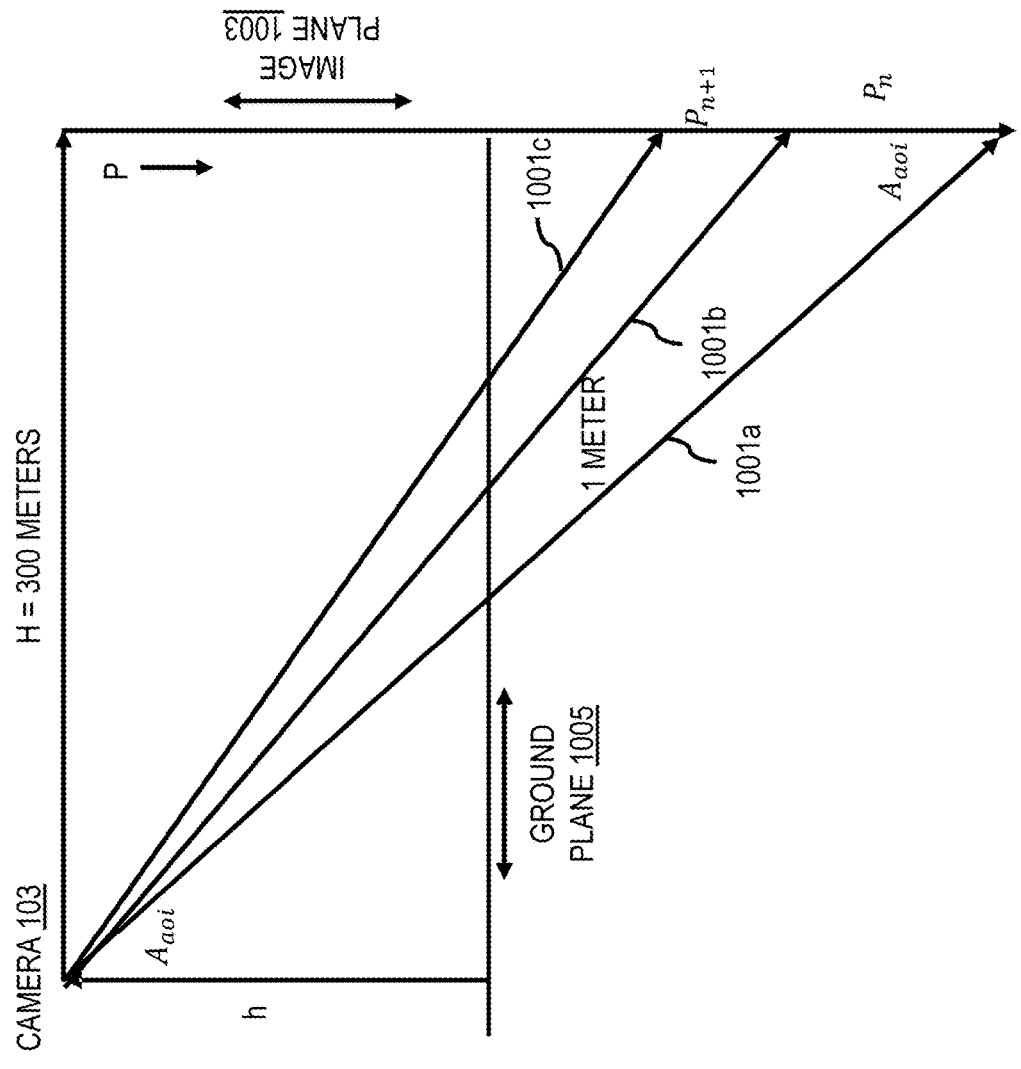
FIG. 10 is a diagram of a process for rendering intervals of distance markers in an image, according to one embodiment.

As discussed above, in one embodiment, the mapping platform 111 can render intervals of multiple distance markers in the image instead of the single marker embodiment described above. Accordingly, in this embodiment, the ray module 505 can project the distance marker or rays corresponding to the distance marker at each designated distance interval from the camera position as shown in the example of FIG. 10. In one embodiment, the mapping platform 11 determines distance markers laid out along the axis defined by the camera path using a single picture of the image. The multiple distance marker embodiment uses a similar to the single marker use case with the exception that multiple distance markers at specified intervals (e.g., 1-meter intervals) are calculated and rendered according to the process described for the single distance marker. In other words, the mapping platform 111 can project rays at a horizon distance to a ground plane and calculates the proportions of length swept out for a ray going through the distance marker. Then one interval at a time (e.g., 1-meter at a time), the ray is moved and the proportion of the image plane corresponding to the distance interval is measure. In one embodiment, the full set of proportions corresponding to the set of distance markers are then normalized to 1, and applied to the camera sensor horizon offset setting (e.g., CCD horizon setting). The ground plane and image plane sweep out the same relative distance allowing the relative ray spread to be used to determine the placement of the distance markers with accuracy using a single image. Because the rays are straight, the proportions on the ground plane are the same as those in the image plane.

To initiate the process for rendering multiple distance markers at designated intervals (e.g., fixed 1-meter intervals), the ray module 505 can determine an initial distance interval of said each designated distance interval based on the camera field of view. This initial distance interval to render, for instance, is located as close to the bottom of the image plane as possible to correspond to the base distance determined from the camera's FOV (e.g., 120°). As shown in the example of FIG. 10, an initial ray 1001*a* corresponding to the bottom of the image plane 1003 is projected from the camera 103 through ground plane 1005. Then the subsequent rays 1001*b*, 1001*c*, etc. corresponding to each designated distance interval/marker are projected to determine there respective positions on the image plane (e.g., $P_n$, $P_{n+1}$, etc.). For example, 1-meter spacing is projected to the image plane 1003 placed sufficiently away from the source or camera 103 (e.g., 300 meters or other distance so that the change in the fixed proportions of each distance marker does not change beyond a threshold with each increase/decrease in mage plane distance (e.g., H).

In one embodiment, finding the proportions of length swept out between rays on the ground plane 1005 will provide the proportion of the distance markers on the image plane 1003 and vice versa. The mapping platform 111 can use similar equations as used for the single marker use case with the addition of iterating the process for each of the distance markers along the designated intervals. For example, the FOV of the camera is used to find the starting d for the image being analyzed or metered. In addition, parameters such as but not limited to: (1) H=fixed image plane distance, and (2) h=fixed height of the camera.

To iterate over the distance intervals, the mapping platform can use the following processes, equations, or equivalent, wherein i is the is the iteration instance for an individual marker:

$d_i$=distance along ground plane that the markers are to be placed;

$c_i = \sqrt{(h^2+d^2)}$; e.g., this is length to the ray to the ground plane 1005;

$$A_{aoi} = \arcsin\left(\frac{d}{c}\right);$$

e.g., this is the angle that the ray from the camera is projected at the image plane 1003 at horizon distance;

$$r_i = \frac{H}{\sin(A_{aoi})};$$

e.g., this is the length of the ray to the image plane 1003;

$P_i = r \times \cos(A_{aoi})$; e.g., Pi is computed for each distance marker interval (e.g., each 1-meter interval), with i representing the distance marker interval (e.g., meter number);

$$ImageDepth = \sum_{i=1}^{Max} P_i - P_{i+1},$$

where Max is the maximum interval number; e.g., the total image depth is used to normalize the ground plane 1005 to the image plane 1003;

$$\frac{P_i - P_{i+1}}{ImageDepth};$$

e.g., for each distance, the proportion of image plane used is then applied to the ground plane, represented by the bottom portion of the camera sensor array that is below the horizon.

Figure 11:
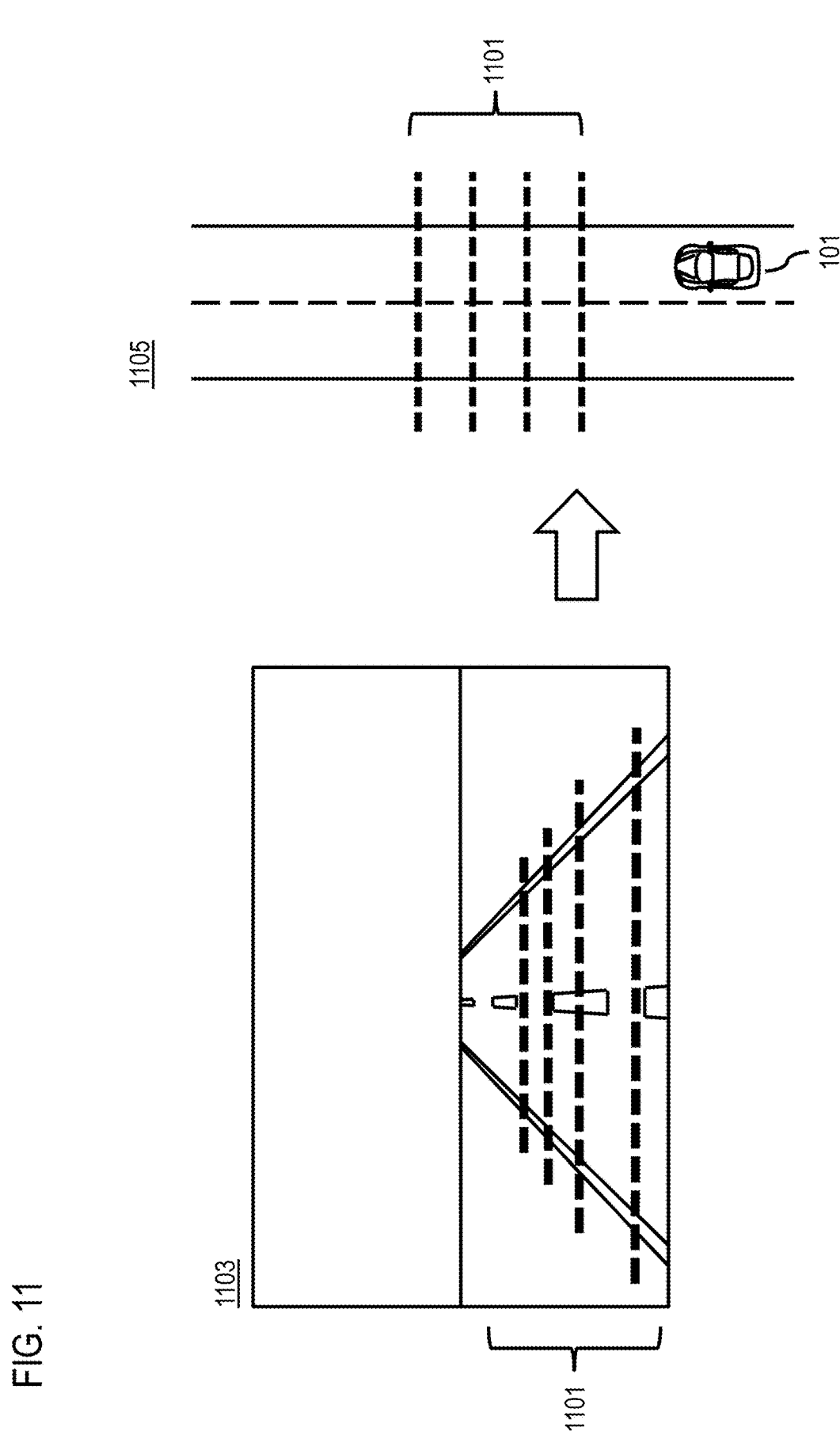
FIG. 11 is an example image in which intervals of distance markers have been rendered in an image, according to one embodiment.

As shown in FIG. 11, the rendering module 507 can then render the set of distance markers 1101 in the image 1103 based on the calculated proportions, resulting in foreshortened perspective from the camera's perspective. The overhead perspective 1105 illustrates that the regular distance intervals between each rendered distance marker 1101. In one embodiment and as shown in the example of FIG. 11, the distance interval is lateral with respect to a direction of the camera. In addition or alternatively, the camera or other secondary cameras can be mounted so that the camera is aimed to the side of the vehicle 101. The side-facing cameras can then be used to generate distance markers that are lateral to the traverse axis of the vehicle (i.e., longitudinal instead of lateral with respect to the longitudinal axis of the vehicle). In other words, when the camera can be mounted on a vehicle, the distance interval or distance marked can be lateral with respect to a longitudinal axis of the vehicle, a transverse axis of the vehicle, or a combination thereof. In one embodiment, the rendering of the distance marker(s) in the image can be performed in real-time as the vehicle 101 travels.

Figure 12:
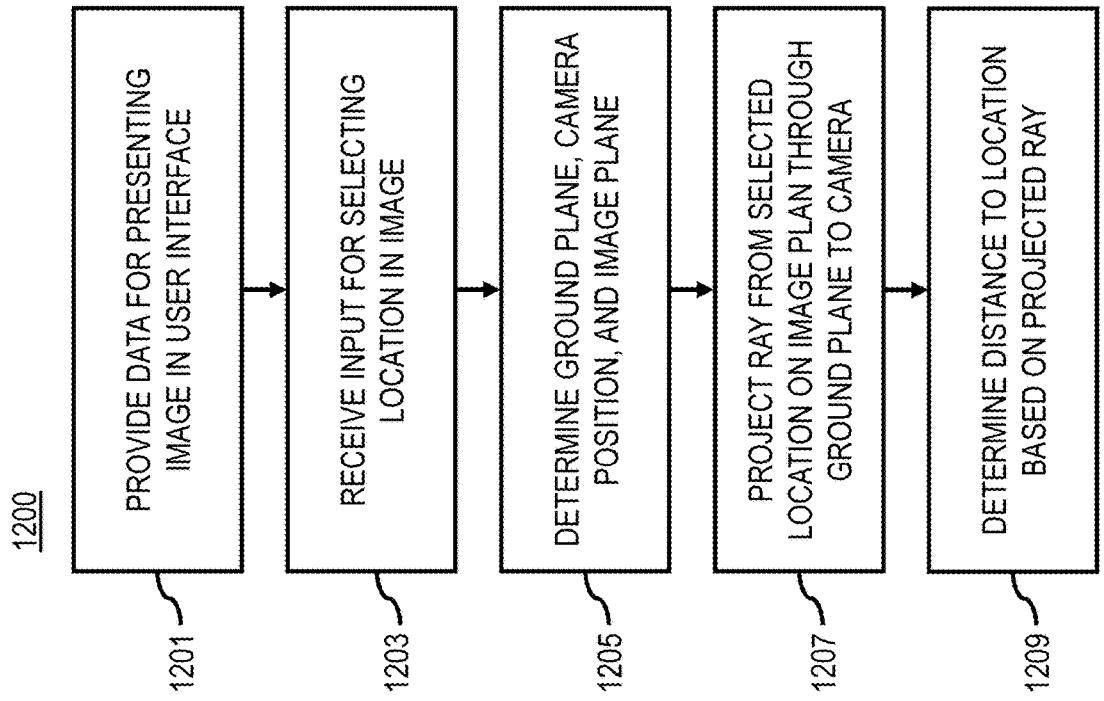
FIG. 12 is a flowchart of a process for estimating the distance of a selected location in an image based on a projected ray, according to one embodiment.
Figure 13:
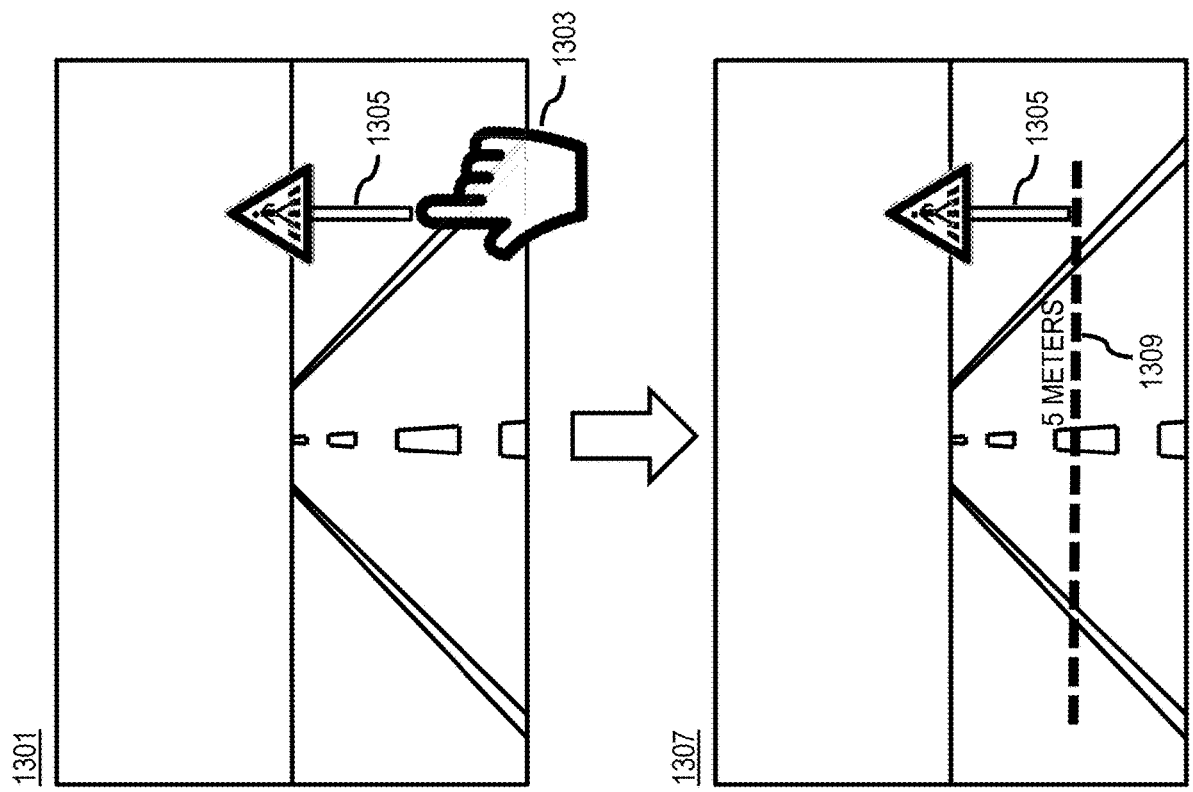
FIG. 13 is a diagram of a user interface for estimating the distance of a selected location in an image, according to one embodiment.

FIG. 12 is a flowchart of a process for estimating the distance of a selected location in an image based on a projected ray, according to one embodiment. In various embodiments, the mapping platform 111 and/or any of the modules 501-507 may perform one or more portions of the process 1200 and may be implemented in, for instance, a chip set including a processor and a memory as shown in FIG. 16. As such, the mapping platform 111 and/or any of the modules 501-507 can provide means for accomplishing various parts of the process 1200, as well as means for accomplishing embodiments of other processes described herein in conjunction with other components of the system 100. Although the process 1200 is illustrated and described as a sequence of steps, its contemplated that various embodiments of the process 1200 may be performed in any order or combination and need not include all of the illustrated steps.

The embodiment described above are described with generating distance markers for annotating or metering images to indicate accurate distance scales. However, the processes described for estimating the distance to a selected location instead of a distance marker in an image. This embodiment is described below.

In step 1201, the rendering module 507 provides data for presenting a user interface depicting an image. For example, the data can include image data and any related metadata (e.g., camera characteristics or configurations). In one embodiment, the user interface is provided as a web-based application, a native application, or a combination thereof, and enables user interaction using any type of interface (e.g., touch input, mouse input, gaze tracking, etc.) for a user to interact with the user interface. In one embodiment, the user interface can be accessed by a client terminal 113 using an application 115. The client terminal 113 and/or application can operate in a local mode or network mode with connectivity to the mapping platform 111 over the communication network 117.

In step 1203, the rendering module 507 receives an input for selecting a location in the image. The input, for instance, can specify a particular object, feature, attribute, etc. depicted in the image. The object is assumed to be rendered at or within a threshold distance of the ground plane. For example, if the object is a road sign, the selected object can be the base of the sign post connecting to the ground plane. Alternatively, the user interface or underlying application can calculate the ground plane connection point of the selected object (e.g., using image processing or object recognition).

Similar to the embodiments described above, in step 1205, the plane module 503 determines a ground plane with respect to a horizon depicted in the image, a camera position of a camera used to capture the image, and an image plane orthogonal to the ground plane representing a two-dimensional environment depicted in the image including the location. By selecting a location in the image, the plane module 503 can correlate the selected location (e.g., selected pixel or pixels of the object) to the corresponding location on the camera sensor array. The positions on the camera sensor array, in turn, correspond to positions on the image plane. As described above, the image plane intersects the ground plane at a designated distance from the camera position that is amenable to a ray-based approach to translating a location on the image plane to a corresponding location on the ground plane with the location on the ground plane representing the estimated distance or location of the selected location/object with respect to the camera position.

Accordingly, in step 1207, the ray module 505 projects a ray from the selected location on the image plane through the ground plane to the camera position. In step 1209, the ray module 505 determines the distance of the location from the camera position based on an intersection point of the ray with the ground plane. The interaction point can be determined using the equations described in the above embodiments (e.g., the embodiments of FIG. 6). In one embodiment, the rendering module 507 can render the determined distance as an output in the user interface. For example, as shown in the user interface 1301 of FIG. 13, the rendering module 507 receives a user input 1303 (e.g., via touch) to select a road sign 1305 for requesting a distance to the road sign 1305. In response, the mapping platform 111 can calculate a corresponding position of the selected road sign 1305 on the ground plane of the image by measuring a projected ray according to the embodiments described herein. As shown in the updated user interface 1307, the rendering module 507 can then render a distance marker 1309 annotated with the computed distance (e.g., 5 meters) of the road sign 1305.

Returning to FIG. 1, as shown, the system 100 includes the vehicle 101 with connectivity to the mapping platform 111 for providing distance markers in images according to the various embodiments described herein. In one embodiment, the vehicle 101 can include a camera sensor 103 or other equivalent sensor that provides imagery (e.g., image data, photographs, etc.) of perspective view as the vehicle travels. It is contemplated that the camera 103 can use visible light and/or any other electromagnetic wavelength that can be used for imaging on which distance markers can be generated and/or overlaid according to the embodiments described herein. In one embodiment, the system 100 can also include a client terminal 113 (e.g., a user computing device) for access the functions of the mapping platform 111.

In one embodiment, the mapping platform 111, vehicle 101, client terminal 113, and/or other components of the system 100 have access to the geographic database 109 which stores representations of mapped geographic features to facilitate location-based services such as but not limited to autonomous driving and/or other mapping/navigation-related applications or services that can use distance markers or map features/attributes placed using distance markers generated according to the embodiments described herein.

In one embodiment, the mapping platform 111, vehicle 101, client terminal 113, etc. have connectivity over the communication network 117 to the services platform 105 that provides one or more services 107 that can use the output of the dynamic location sampling processes described herein. By way of example, the services 107 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, services platform 105, and/or other components of the system 100 may be platforms with multiple interconnected components. The mapping platform 111, services platform 105, etc. may include multiple servers, intelligent networking devices, computing devices, components and corresponding software for providing map-based dynamic location sampling. In addition, it is noted that the mapping platform 111 may be a separate entity of the system 100, a part of the one or more services 107, a part of the services platform 105, or included within the client terminal 113 and/or vehicle 101.

In one embodiment, content providers 119a-119m (collectively referred to as content providers 119) may provide content or data to the geographic database 109, the mapping platform 111, the services platform 105, the services 107, the client terminal 113, and/or the vehicle 101. The content provided may be any type of content, such as map content, textual content, audio content, video content, image content, etc. In one embodiment, the content providers 119 may provide content that may aid in the detecting and ensuring the quality of map features and their properties from sensor data and estimating the confidence and/or accuracy of the detected features. In one embodiment, the content providers 119 may also store content associated with the geographic database 109, mapping platform 111, services platform 105, services 107, client terminal 113, and/or vehicle 101. In another embodiment, the content providers 119 may manage access to a central repository of data, and offer a consistent, standard interface to data, such as a repository of the geographic database 109.

In one embodiment, the client terminal 113 and/or vehicle 101 may execute a software application (e.g., application 115) for providing distance markers in images for location-base services according the embodiments described herein. By way of example, the application may also be any type of application that is executable on the client terminal 113 and/or vehicle 101, such as autonomous driving applications, mapping applications, location-based service applications, navigation applications, content provisioning services, camera/imaging application, media player applications, social networking applications, calendar applications, and the like. In one embodiment, the application may act as a client for the mapping platform 111, services platform 105, and/or services 107 and perform one or more functions associated with providing distance markers in images.

By way of example, the client terminal 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 113 can support any type of interface to the user (such as "wearable" circuitry, etc.). In one embodiment, the client terminal 113 may be associated with the vehicle 101 or be a component part of the vehicle 101.

In one embodiment, the client terminal 113 and/or vehicle 101 are configured with various sensors for generating or collecting environmental sensor data (e.g., for processing by the mapping platform 111), related geographic data, etc. including but not limited to, location, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture map features or attributes that can be placed using distance markers), an audio recorder for gathering audio data, velocity sensors mounted on steering wheels of the vehicles, switch sensors for determining whether one or more vehicle switches are engaged, and the like.

Other examples of sensors of the client terminal 113 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the client terminal 113 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the client terminal 113 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 105, services 107, client terminal 113, vehicle 101, and/or content providers 119 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 14:
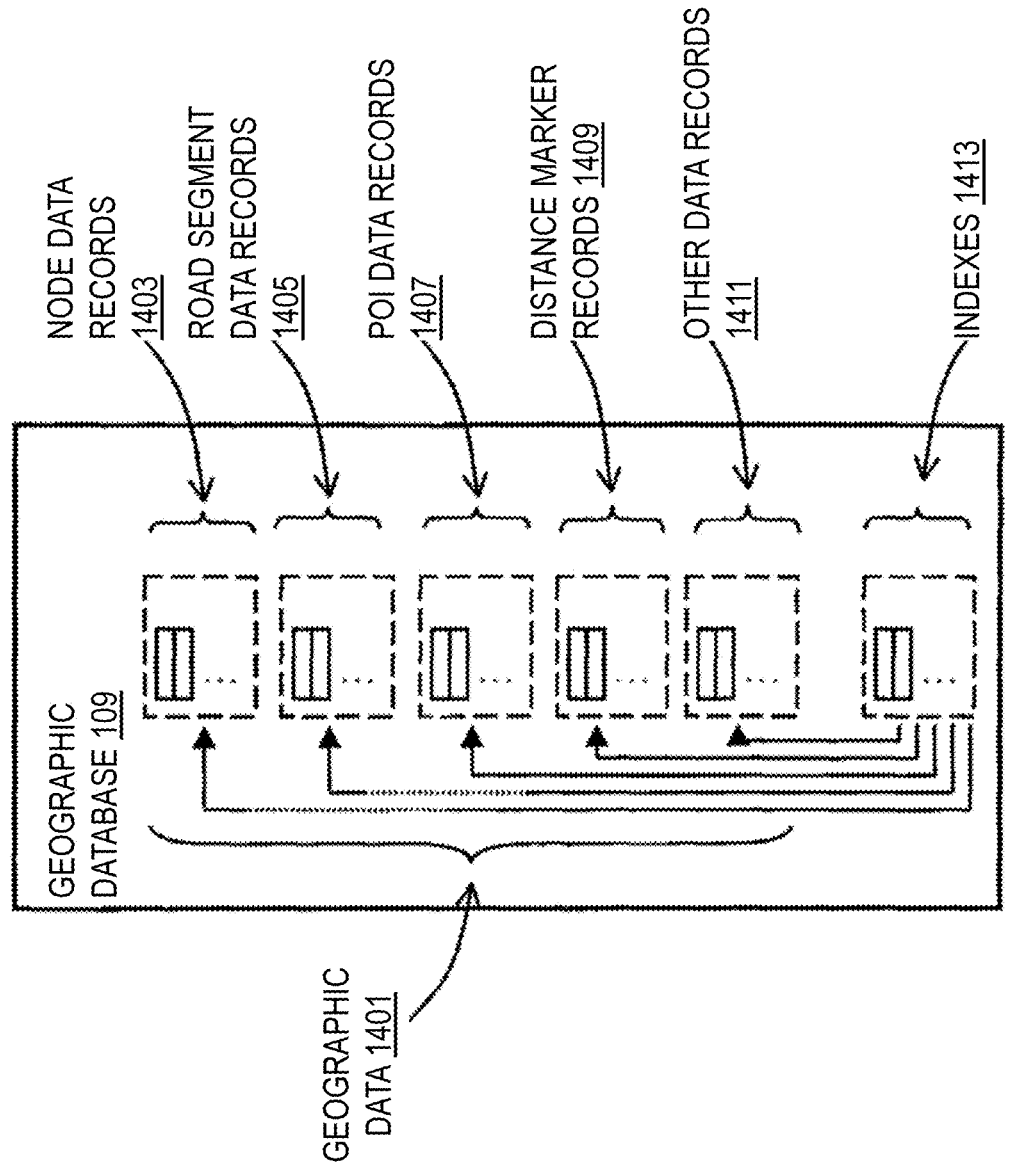
FIG. 14 is a diagram of a geographic database, according to one embodiment.

FIG. 14 is a diagram of a geographic database, according to one embodiment. In one embodiment, the geographic database 109 includes geographic data 1401 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1403, road segment or link data records 1405, POI data records 1407, distance marker data records 1409, other records 1411, and indexes 1413, for example. More, fewer or different data records can be provided. In one embodiment, additional data records (not shown) can include cartographic ("carto") data records, routing data, and maneuver data. In one embodiment, the indexes 1413 may improve the speed of data retrieval operations in the geographic database 109. In one embodiment, the indexes 1413 may be used to quickly locate data without having to search every row in the geographic database 109 every time it is accessed. For example, in one embodiment, the indexes 1413 can be a spatial index of the polygon points associated with stored feature polygons.

In exemplary embodiments, the road segment data records 1405 are links or segments representing roads, streets, or paths, as can be used in the calculated route or recorded route information for determination of one or more personalized routes. The node data records 1403 are end points corresponding to the respective links or segments of the road segment data records 1405. The road link data records 1405 and the node data records 1403 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1407. The geographic database 109 can also include data about places, such as cities, towns, or other communities, and other geographic features, such as bodies of water, mountain ranges, etc. Such place or feature data can be part of the POI data records 1407 or can be associated with POIs or POI data records 1407 (such as a data point used for displaying or representing a position of a city).

In one embodiment, the geographic database 109 can also include distance marker data records 1409 for imagery, calculated distance markers, distance estimations to map features/attributes, user distance estimation requests, and/or related data. The distance marker data records 1409 can also include collected vehicle sensor data, detected map feature locations, user preferences with respect to distance markers, and/or the like. In one embodiment, the distance marker data records 1409 and/or the distance marker/placed map features or attributes can be associated with segments of a road link (as opposed to an entire link). It is noted that the segmentation of the road for the purposes of distance marker rendering and/or corresponding map attribute placement can be different than the street network or road link structure of the geographic database 109. In other words, the segments can further subdivide the links of the geographic database 109 into smaller segments (e.g., of uniform lengths such as 5-meters). In this way, the distance markers and/or corresponding map features can be placed or represented at a level of granularity that is independent of the granularity or at which the actual road or road network is represented in the geographic database 109. In one embodiment, the distance marker data records 1409 can be associated with one or more of the node records 1403, road segment records 1405, and/or POI data records 1407; or portions thereof (e.g., smaller or different segments than indicated in the road segment records 1405, individual lanes of the road segments, etc.).

In one embodiment, the geographic database 109 can be maintained by the content provider 119 in association with the services platform 105 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached. In one embodiment, the map-based dynamic location sampling rates/data transmission rates can be associated with individual grid cells at any zoom level.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a geographic database stored in a format that facilitates updating, maintenance, and development. For example, the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101 and/or client terminal 113. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received network in a delivery format to produce one or more compiled navigation databases.

The processes described herein for providing distance markers in an image may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 15:
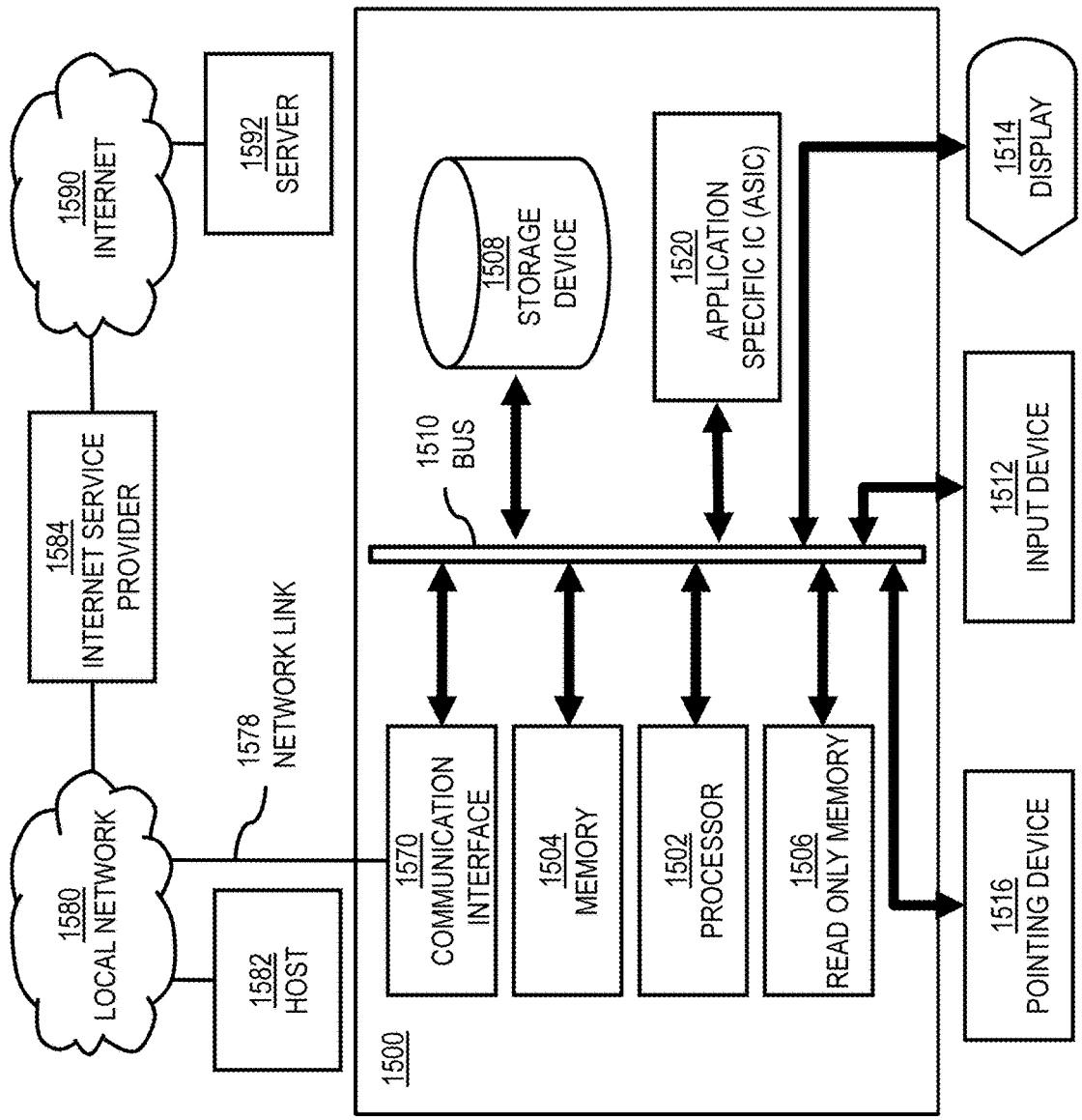
FIG. 15 is a diagram of hardware that can be used to implement an embodiment.

FIG. 15 illustrates a computer system 1500 upon which an embodiment of the invention may be implemented. Computer system 1500 is programmed (e.g., via computer program code or instructions) to provide distance markers in an image as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to providing distance markers in an image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for providing distance markers in an image. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for providing distance markers in an image, is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 117 for providing distance markers in an image.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 16 illustrates a chip set 1600 upon which an embodiment of the invention may be implemented. Chip set 1600 is programmed to provide distance markers in an image as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to provide distance markers in an image. The memory 1605 also stores the data associated with or generated by the execution of the inventive steps.

Figure 17:
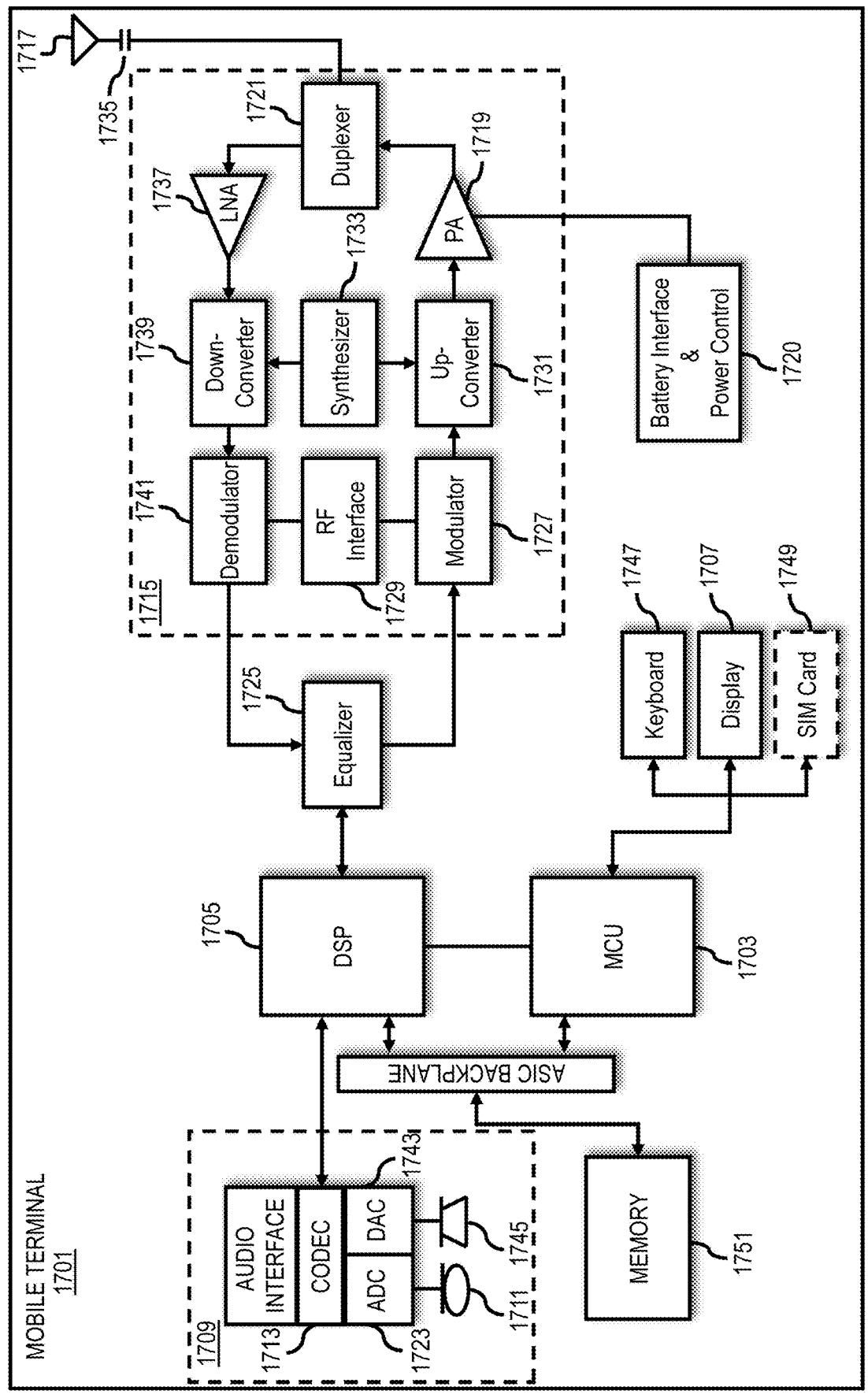
FIG. 17 is a diagram of a mobile terminal (e.g., handset or vehicle or part thereof) that can be used to implement an embodiment of the invention.

FIG. 17 is a diagram of exemplary components of a mobile terminal 1701 (e.g., handset or vehicle 101 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile station functions that offer automatic contact matching. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile station 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU) (not shown).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile station 1701 to provide distance markers in an image. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the station. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile station 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1751 may be, but not limited to, a single memory, CD, DVD, ROM, RAM, EEPROM, optical storage, or any other non-volatile or non-transitory storage medium capable of storing digital data.

An optionally incorporated SIM card 1749 carries, for instance, important information, such as the cellular phone number, the carrier supplying service, subscription details, and security information. The SIM card 1749 serves primarily to identify the mobile station 1701 on a radio network. The card 1749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for rendering a distance marker in an image comprising:
   determining a plurality of camera characteristics of a camera used to capture the image, wherein the plurality of camera characteristics includes a camera field of view, a horizon offset, a camera mounting height, a camera mounting axis, or a combination thereof;
   determining a ground plane extending to a horizon depicted in the image, a camera position with respect to the ground plane, and an image plane based on the plurality of characteristics, wherein the image plane is orthogonal to the ground plane and intersects the ground plane at a designated distance from the camera position;
   determining a first marker position on the ground plane that corresponds to the distance marker;
   projecting a ray from the camera position through the first marker position on the ground plane to a second marker position on the image plane;
   applying a proportion of the ray to the horizon offset on the image plane to determine a rendering position of the distance marker at the second marker position of the image plane; and
   rendering the distance marker in the image based on the rendering position.

2. The method of claim 1, further comprising:
   projecting the distance marker at each designated distance interval from the camera position.

3. The method of claim 2, further comprising:
   determining an initial distance interval of said each designated distance interval based on the camera field of view.

4. The method of claim 2, wherein the distance interval is lateral with respect to a direction of the camera.

5. The method of claim 2, wherein the camera is mounted on a vehicle, and wherein the distance interval is lateral with respect to a longitudinal axis of the vehicle, a transverse axis of the vehicle, or a combination thereof.

6. The method of claim 1, wherein the proportion is a length swept out for the ray, further comprising:
   calculating the proportion through the first marker position with respect to the designated distance at which the image plane intersects the ground plane.

7. The method of claim 6, further comprising:
   normalizing the proportion to 1 before applying the proportion against the horizon offset.

8. The method of claim 1, wherein the horizon offset represents an area of a sensor array of the camera that corresponds to an image area that is below the horizon depicted in the image.

9. The method of claim 1, wherein the camera is mounted on a vehicle, and wherein the rendering of the distance marker in the image is performed in real-time as the vehicle travels.

10. The method of claim 1, wherein the image plane corresponds to a two-dimensional projection of an environment depicted in the image.

11. An apparatus for rendering a distance marker in an image comprising:
    at least one processor; and
    at least one memory including computer program code for one or more programs,
    the at least one memory and the computer program code configured to, with the at least one processor, cause the apparatus to perform at least the following,
    providing data for presenting a user interface depicting the image;
    receiving an input for selecting a location in the image;
    determining a ground plane with respect to a horizon depicted in the image, a camera position of a camera used to capture the image, and an image plane orthogonal to the ground plane representing a two-dimensional environment depicted in the image including the location;
    projecting a ray from the selected location on the image plane through the ground plane to the camera position;
    applying a proportion of the ray to a horizon offset associated with the camera on the image plane to determine a rendering position of the distance marker; and
    determining the distance of the location from the camera position based on an intersection point of the ray with the ground plane; and
    rendering the distance marker in the user interface to represent the determined distance.

12. The apparatus of claim 11, wherein the camera is mounted on a vehicle, and wherein the rendering of the distance marker in the user interface is performed in real-time as the vehicle travels.

13. The apparatus of claim 11, wherein the user interface is provided as a web-based application, a native application, or a combination thereof.

14. The apparatus of claim 11, wherein the image plane intersects the ground plane at a designated distance from the camera position.

15. A non-transitory computer-readable storage medium for rendering a distance marker in an image, carrying one or more sequences of one or more instructions which, when executed by one or more processors, cause an apparatus to perform:
    determining a plurality of camera characteristics of a camera used to capture the image, wherein the plurality of camera characteristics include a horizon offset;
    determining a ground plane extending to a horizon depicted in the image, a camera position with respect to the ground plane, and an image plane based on the plurality of characteristics, wherein the image plane is orthogonal to the ground plane and intersects the ground plane at a designated distance from the camera position;
    projecting a ray from the camera position through the distance marker on the ground plane to a marker position on the image plane;
    applying a proportion of the ray to the horizon offset on the image plane to determine a rendering position of the distance marker at the marker position of the image plane; and
    rendering the distance marker in the image based on the rendering position.

16. The non-transitory computer-readable storage medium of claim 15, wherein the plurality of camera characteristics further include a camera field of view, a camera mounting height, a camera mounting axis, or a combination thereof.

17. The non-transitory computer-readable storage medium of claim 15, wherein the apparatus is further caused to perform:
    projecting the distance marker at each designated distance interval from the camera position.

18. The non-transitory computer-readable storage medium of claim 17, wherein the apparatus is further caused to perform:
    determining an initial distance interval of said each designated distance interval based on the camera field of view.

19. The non-transitory computer-readable storage medium of claim 17, wherein the distance interval is lateral with respect to a direction of the camera.

* * * * *